Dec. 23, 1969  J. E. CAVENEY  3,485,937

WIRING ASSEMBLY AND DUCT COVER THEREFOR

Filed July 25, 1968

INVENTOR
JACK E. CAVENEY
BY
Prangley, Baird, Clayton,
Miller & Vogel
ATTYS.

United States Patent Office 3,485,937
Patented Dec. 23, 1969

3,485,937
WIRING ASSEMBLY AND DUCT COVER
THEREFOR
Jack E. Caveney, Chicago, Ill., assignor to Panduit Corp.,
Finley Park, Ill., a corporation of Delaware
Filed July 25, 1968, Ser. No. 747,574
Int. Cl. H02g 3/14
U.S. Cl. 174—101                                      8 Claims

ABSTRACT OF THE DISCLOSURE

There is disclosed a wiring assembly including a duct having an elongated base with two parallel rows of upstanding fingers therealong to receive a bundle of wires therebetween with adjacent pairs of fingers receiving selected ones of the wires therebetween, each of the fingers having a holding flange thereon extending laterally with respect to the duct, a cover including an elongated main wall overlying the duct and having side flanges extending downwardly over the holding flanges and retaining flanges extending under the holding flanges, and two strips of resilient plastic resin integral with the side flanges on the inner surfaces thereof for engaging the holding flanges to hold the cover on the duct, the cover being formed of a polyvinyl chloride resin having a high durometer value and the strips being formed of a plasticized polyvinyl chloride resin having a low durometer value.

---

The present invention is directed to a wiring assembly of the type including a duct accommodating a bundle of wires therein, and a cover for the duct to hold the bundle of wires in place.

It is an important object of the invention to provide an improved wiring assembly including in combination a duct of channel shape having an elongated base and two side walls extending longitudinally thereof and respectively disposed adjacent to the longitudinal edges thereof, the duct accommodating a bundle of wires therein, each of the side walls having a holding flange thereon adjacent to the outer end thereof and extending laterally outwardly with respect to the duct, a cover of rigid synthetic plastic resin and including an elongated main wall having two essentially parallel side flanges extending longitudinally thereof and respectively disposed along the longitudinal edges thereof, the cover overlying the base and holding a bundle of wires in the duct with each of the side flanges overlying the adjacent one of the holding flanges, and two elongated strips of relatively soft synthetic organic plastic resin respectively integral with the side flanges on the inner surfaces thereof, the side surfaces of the holding flanges engaging the adjacent one of the strips to prevent inadvertent movement of the cover with respect to the duct.

In connection with the foregoing object, it is another object of the invention to provide a wiring assembly of the type set forth in which the cover is formed of a polyvinyl chloride resin and the strips are formed of a plasticized polyvinyl chloride resin, the resin of the cover having a durometer value in the range from about D-54 to about D-104 and the resin of the strips having a durometer value in the range from about A-30 to about A-100.

Another object of the invention is to provide a wiring assembly of the type set forth wherein the holding flanges are resiliently urged into the strips, and after the passage of time the strips are permanently depressed by the holding flanges due to cold flow of the resin of the strips, whereby the cover is initially easily installed and after the passage of time the cover is locked in place.

Another object of the invention is to provide a wiring assembly of the type set forth wherein the cover has retaining flanges respectively integral with the side flanges and each extending inwardly toward the other of the side flanges and spaced from the main wall, the retaining flanges cooperating with the holding flanges to retain the cover on the duct.

A further object of the invention is to provide an improved cover of the type set forth for use in wiring assemblies.

Further features of the invention pertain to the particular arrangement of the parts of the wiring assembly and the cover forming a part thereof, whereby the above-outlined and additional operating features thereof are attained.

The invention, both as to its organization and method of operation, together with further objects and advantages thereof, will best be understood by reference to the following specification taken in connection with the accompanying drawing in which.

Figure 1:
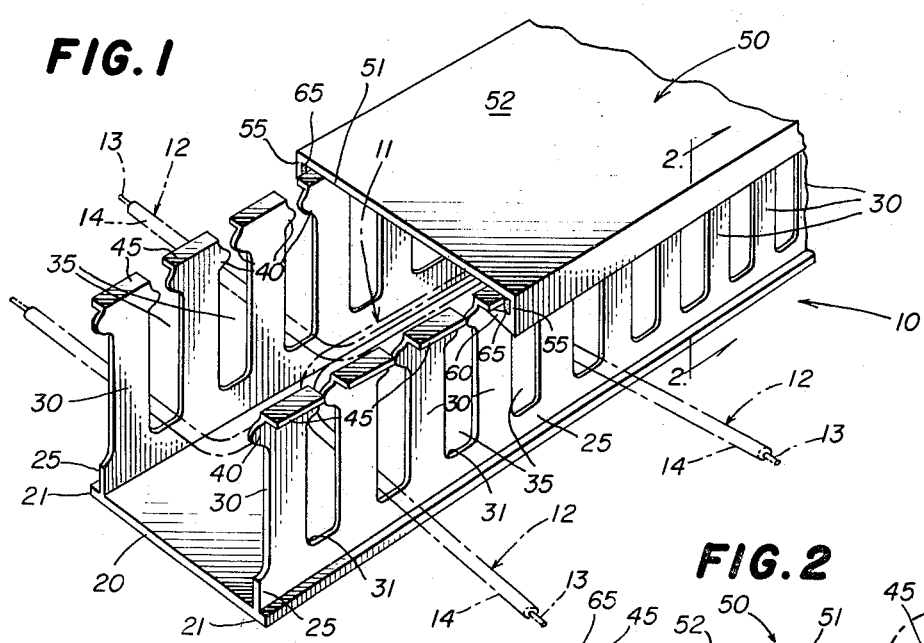
FIGURE 1 is a perspective view of a wiring assembly made in accordance with and embodying the principles of the present invention, the wiring assembly also including a novel cover made in accordance with the present invention.
Figure 2:
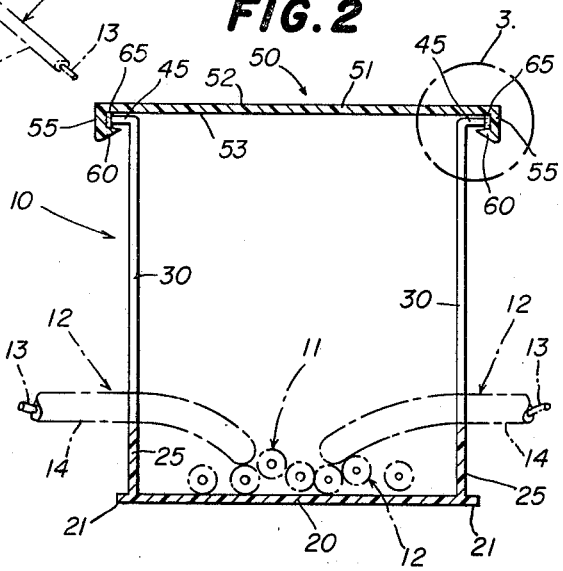
FIG. 2 is an enlarged view in vertical section through the wiring assembly of FIG. 1 along the line 2—2 thereof.

Referring to FIGS. 1 and 2 of the drawing, there is illustrated a wiring assembly including a wiring duct 10 which serves to contain and channel a bundle 11 of electrically conductive wires 12. As illustrated, each of the wires 12 include an electrical conductor 13 and an associated insulation or covering 14 thereon, thus permitting the wires 12 to be placed in the bundle 11 within the duct 10. The wiring duct 10 is generally channel-shaped and includes an elongated rectangular base 20 having two side walls 25 extending longitudinally thereof and respectively disposed adjacent to the longitudinal edges of the base 20, but spaced a short distance inwardly thereof. The portions of the base 20 that extend outwardly beyond the side walls 25 provide mounting flanges 21 that are used to secure the base 20, and thereby the remaining parts of the wiring duct 10, on any desired mount therefor.

The side walls 25 have a very small height compared to the width of the base 20 and extending upwardly from each of the side walls 25 is a plurality of longitudinally spaced apart fingers 30, the fingers 30 being joined to the upper edges of the side walls 25 as the rounded junctures 31. Adjacent fingers 30 provide therebetween slots 35 through which one or more wires 12 may be individually routed to appropriate terminals. Adjacent to the upper end of each of the fingers 30 there are provided longitudinally extending ears or projections 40, the ears 40 on adjacent fingers 30 being spaced only a short distance apart. The uppermost end of each of the fingers 30 carries a holding flange 45 extending laterally outwardly therefrom with respect to the duct 10 and being essentially rectangular in shape and including an upper surface 46 and an under surface 47 and a side surface 48, see FIGS. 3 and 4 particularly.

In order to retain the bundle 11 of the wires 12 within the wiring duct 10, there has been provided therefor a cover 50 which can be readily applied thereto and which once applied thereto for a length of time can be shifted therealong only with difficulty, thereby to retain the cover 50 in place. More specifically, the cover 50 includes a generally rectangular main wall 51 having dimensions such as to overlie and cover the base 20 of the wiring duct 10, the main wall 51 having an outer surface 52 and an inner surface 53. The longitudinally extending edges of the main wall 51 carry essentially parallel side flanges 55 respectively extending longitudinally thereof and each provided with an outer surface 56 and an inner surface 57. Each of the side flanges 55 carries an integral retaining flange 60 that is directed inwardly toward the opposite side flange 55 and includes an inclined outer surface 61 that is inclined toward the inner surface 53 of the main wall 51, and an inclined inner surface 62 that is inclined away from the inner surface 53 of the main wall 51. As illustrated, the retaining flanges 60 extend inwardly to underlie the adjacent holding flanges 45, thereby to retain the cover 50 upon the duct 10.

Finally, there is provided a pair of elongated strips or pads 65 on the inner surfaces 57 of the side flanges 50 and disposed between the inner surface 53 of the cover 50 and the inner surface 62 of the retaining flange 60, the strips 65 being formed integral with the cover 50, and specifically integral with the main wall 51 and the side wall 55 and the retaining flanges 60 and confined thereby. The side surfaces 48 of the holding flanges 45 abut against the adjacent one of the strips 65 and cooperate therewith to prevent inadvertent longitudinal movement between the wiring duct 10 and the cover 50 therefor.

A preferred material of construction for the wiring duct 10 is a synthetic organic plastic resin that is relatively firm in character, a preferred resin being a rigid polyvinyl chloride resin such as that sold by B. F. Goodrich Chemical Co. under No. 8700. Preferred ones of such rigid polyvinyl chloride having a durometer hardness or value in the range from about D–54 to about D–104, the preferred value being about D–79. It will be appreciated that such material, although firm, is resilient, whereby the fingers 30 can be pressed inwardly, and when so pressed inwardly will tend to move resiliently outwardly. Also, a wiring duct 10 formed of such material may be readily cut on the job to the desired length, all as is understood in the art.

The cover 50 and the strip 65 thereon are formed integral and are extruded simultaneously into a common die from two extruder heads, whereby the cover 50 including the strips 65 is formed integral as a continuous extrusion. The preferred material of construction of the cover 50 is a synthetic organic plastic resin, the preferred resin being a polyvinyl chloride resin such as that sold by the B. F. Goodrich Chemical Co. under No. 8700. The main wall 51, the side flanges 55 and the retaining flanges 60 are molded from a rigid form of such polyvinyl chloride resin which after extrusion has a durometer hardness or value in the range from about D–54 to about D–104, the preferred value being about D–79. When formed of these materials, the parts of the cover 50 including the main wall 51, the side flanges 55 and the retaining flanges 60, are all mechanically strong and possess a certain resiliency yet can be readily cut on the job to any desired length. The strips 65 on the other hand are formed of a plasticized polyvinyl chloride resin having a durometer hardness or value in the range from about A–30 to A–100, the preferred value being about A–65.

Preferably, the strips 65 of the cover 50 have the facing surfaces thereof spaced apart a distance slightly less than the "as-formed" distance between the side surfaces 48 on opposed sets of the fingers 30, whereby the fingers 30 must be deformed inwardly a small distance in order to receive the cover 50 over the holding flanges 45. The nature of the material forming the strips 65 is such that the cover 50 can be readily applied to the wiring duct 10 by sliding the cover 50 thereon over the holding flanges 45, and thereafter the cover 50 can be properly positioned with respect to the wiring duct 10 by ready sliding movement thereof with respect to the wiring duct 10.

After placement of the cover 50 on the wiring duct 10, the resilience in the fingers 30 will continuously urge the holding flanges 45, and specifically the side surfaces 48 thereof, into the strips 65. After the passage of time, the side surfaces 48 of the holding flanges 45 will move inwardly into the strips 65 to the dashed line positions illustrated in FIGS. 3 and 4. After the holding flanges 45 move to the dashed positions thereof in FIGS. 3 and 4, there is a marked resistance to the shifting of the cover 50 with respect to the wiring duct 10, whereby the cover 50 is held in the adjusted position with respect to the duct 10. In other words, the material of the pad 65 becomes permanently indented so that the presence of the holding flanges 45 in the permanent indentations in the strips 65 serve to hold the cover locked in place with respect to the duct 10. However, it will be appreciated that due to the resilience of the fingers 30, it is still possible by applying sufficient force to remove the cover 50 if this is desirable, but the cover 50 cannot inadvertently be shifted with respect to the duct 10.

Recapitulating, in the use of the wiring duct 10, the duct 10 is first mounted on a suitable support by fasteners (not shown) engaging the base 20 and preferably the mounting flanges 21 thereof. The wiring duct 10 of the present invention is particularly useful in those installations wherein vibration or shock may be encountered, such uses being in vehicles including locomotives, aircraft and the like, and in similar installations wherein vibration and shock will be encountered. The bundle 11 of the wires 12 is then formed in the duct 10, suitable ones of the wires 12 being routed through the slots 35 in the sides of the duct 10, all is well understood in the art.

When the bundle 11 is complete, or at the end of a stage in the formation thereof, the cover 50 is placed in position. The cover 50 may be slid into position from one end of the wiring duct 10, or, alternatively, the cover 50 may be placed in position by engaging one of the retaining flanges 60 under the associated group of holding flanges 45 and then deforming the other set of fingers 30 inwardly to permit the cover 50 to be placed in position, after which release of the deformed fingers 30 permits the fingers 30 to be moved into positions such that the holding flanges 45 thereof are engaged by the other retaining flange 60. In any event, and regardless of the manner of application of the cover 50 to the wiring duct 10, the side surfaces 48 of the holding flanges 45 are now in contact with the outer surface of the associated strip 65 and are resiliently urged into engagement therewith due to the resiliency of the fingers 30 and due to the fact that the as-formed distance between the side surfaces 48 of the holding flanges 45 is greater than the distance between the opposed surfaces of the strips 65. Nonetheless, the cover 50 can be readily slid into position with respect to the wiring duct 10 immediately upon application thereto. The retaining flanges 60 serve to hold the cover 50 against bodily removal in a direction away from the base 20, while the resilient urging of the holding flanges 45 against the adjacent surfaces of the strips 65 serves to prevent inadvertent longitudinal shifting of the cover 50 with respect to the wiring duct 10.

Figure 3:
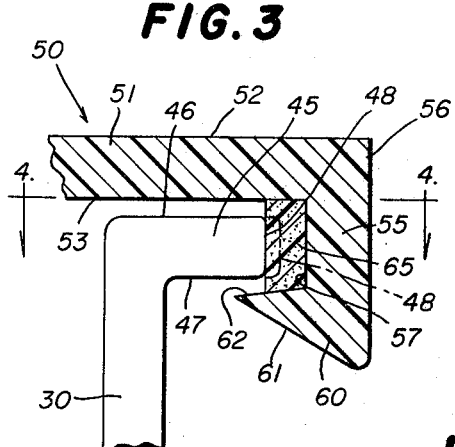
FIG. 3 is a further enlarged fragmentary view in section of that portion of the structure enclosed within the dashed circle in FIG. 2.
Figure 4:
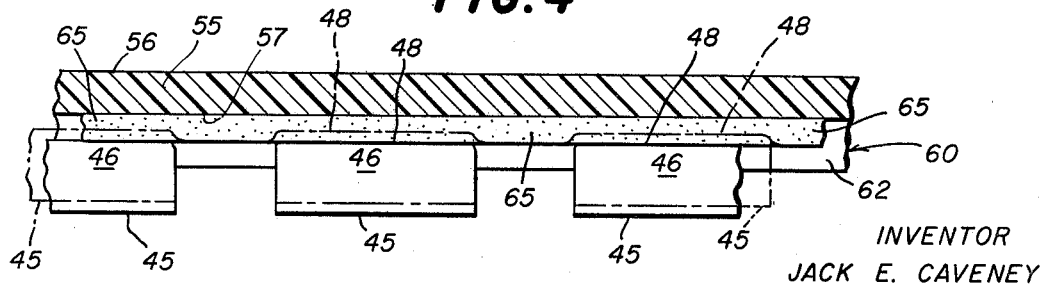
FIG. 4 is a fragmentary view in section in the direction of the arrows along the line 4—4 in FIG. 3.

After the passage of time, and due to the resilient character and the cold flow characteristics of the material of the strips 65, the continual urging of the holding flanges 45 thereagainst due to the resiliency of the fingers 30 will cause the holding flanges 45 to become indented in the adjacent strip 65 as illustrated in FIGS. 3 and 4. More specifically, the side surfaces 48 of the holding flanges 45 moving into the strip 65 from the positions illustrated by solid lines to the positions illustrated by dashed lines in FIGS. 3 and 4. It is clear that with the holding flanges 45 embedded in the strips 65, there is now a greatly increased resistance to inadvertent longitudinal displacement of the cover 50 with respect to the wiring duct 10. Despite this additional resistance to inadvertent displacement between the cover 50 and wiring duct 10, it is to be understood that the cover 50 may be removed due to the resiliency of the fingers 30 which permits disengagement of the holding flanges 45 from the strip 65 and with respect to the associated retaining flange 60.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A wiring assembly comprising in combination, a duct of channel shape including an elongated base and two side walls extending longitudinally thereof and respectfully disposed adjacent to the longitudinal edges thereof, said duct accommodating a bundle of wires therein, each of said side walls having a holding flange thereon adjacent to the outer end thereof and extending laterally outwardly with respect to said duct, each of said side walls having openings therein for the routing of individual wires therethrough, A cover of a relatively rigid synthetic organic plastic resin and including an elongated main wall having two essentially parallel side flanges extending longitudinally thereof and respectively disposed along the longitudinal edges thereof, said cover overlying said base and holding the bundle of wires in said duct with each of said side flanges overlying the adjacent one of said holding flanges, and two elongated strips of a relatively, soft synthetic organic plastic resin respectively integral with said side flanges on the inner surfaces thereof, the side surfaces of said holding flanges engaging the adjacent one of said strips to prevent inadvertent movement of said cover with respect to said duct, said holding flanges being resiliently urged into said strips and after the passage of time said strips being permanently depressed by said holding flanges due to cold flow of the resin of said strips, whereby said cover is initially easily installed and after the passage of time said cover is locked in place.

2. The wiring assembly set forth in claim 1, wherein said cover is formed of a polyvinyl chloride resin and said strips are formed of a plasticized polyvinyl chloride resin.

3. The wiring assembly set forth in claim 1, wherein the relatively rigid synthetic organic plastic resin of said cover has a durometer value in the range from about D–54 to about D–104 and the relatively soft synthetic organic plastic resin of said strips has a durometer value in the range from about A–30 to about A–100.

4. The wiring assembly set forth in claim 1, and further comprising retaining flanges respectively on said side flanges and extending inwardly toward each other and underlying said holding flanges to retain said cover on said duct.

5. A wiring assembly comprising in combination, a duct including an elongated base having two essentially parallel rows of upstanding fingers extending longitudinally thereof and respectively disposed adjacent to the longitudinal edges thereof, said duct accommodating a bundle of wires therein and adjacent pairs of said fingers defining slots receiving selected ones of the wires of the bundle therethrough, each of said fingers having a holding flange thereof adjacent to the outer end thereof and extending laterally outwardly with respect to said duct, a cover of a relatively firm synthetic organic plastic resin and including an elongated main wall having two essentially paralle side flanges extending longitudinally thereof and respectively disposed along the longitudinal edges thereof, said cover overlying said base and holding the bundle of wires in said duct with each of said side flanges overlying the adjacent ones of said holding flanges, retaining flanges respectively integral with said side flanges and each extending inwardly toward the other of said side flanges and spaced from said main wall, said retaining flanges cooperating with said holding flanges to retain said cover on said duct, and two elongated strips of a relatively resilient synthetic organic plastic resin respectively integral with said side flanges on the inner surfaces thereof and disposed between said main wall and the adjacent one of said retaining flanges, the side surfaces of said holding flanges engaging the adjacent one of said strips to prevent inadvertent movement of said over with respect to said duct.

6. A cover for use on a channel-shaped duct including an elongated base and two side walls extending longitudinally thereof and respectivey disposed adjacent to the longitudinal side edges thereof for accommodating a bundle of wires therein, wherein each of the side walls has a holding flange thereon adjacent to the outer end thereof and extending laterally outwardly with respect to the duct, said cover comprising an elongated main wall having two essentially parallel side flanges extending longitudinally thereof and respectively disposed along the longitudinal edges thereof, said cover being of a relatively rigid synthetic organic plastic resin and two elongated strips of a relatively soft synthetic organic plastic resin respectively integral with said side flanges on the inner surfaces thereof, said strips adapted respectively to engage the adjacent one of the side surfaces of the holding flanges to prevent inadvertent movement of said cover with respect to the associated duct, and adapted to be permanently indented by the associated holding flanges due to the cold flow of the resin thereof, whereby initially said cover is easily installed upon the associated duct and after a time the cover is locked in place on the associated duct.

7. The cover set forth in claim 6, wherein said main wall and said side flanges have a durometer value in the range from about D–54 to about D–105, and said strips have a durometer value in the range from about A–30 to about A–100.

8. A cover for use on a channel-shaped duct including an elongated base having two essentially parallel rows of upstanding fingers extending longitudinally thereof and respectively disposed adjacent to the longitudinal edges thereof for accommodating a bundle of wires therein with adjacent pairs of the fingers defining slots receiving ones of the wires of the bundle thereof, wherein each of the fingers has a holding flange thereon adjacent to the outer end thereof and extending outwardly with respect to the duct, said cover comprising an elongated main wall having essentially parallel side flanges extending longitudinally thereof and respectively disposed along the longitudinal edges thereof, said cover being of a relatively firm synthetic organic plastic resin, retaining flanges respectively integral with said side flanges and each extending inwardly toward the other of said side flanges and spaced from said main wall, said retaining flanges adapted to cooperate with the associated holding flanges to retain said cover on the associated duct, and two elongated strips of a relatively resilient synthetic organic plastic resin respectively integral with said side flanges on the inner surfaces thereof and disposed between said main wall and the adjacent one of said retaining flanges, said strips adapted respectively to engage the side surfaces of the associated holding flanges to prevent inadvertent movement of said cover with respect to the associated duct.

References Cited

UNITED STATES PATENTS

| 3,024,301 | 3/1962 | Walch. |
| 3,126,444 | 3/1964 | Taylor. |

FOREIGN PATENTS

| 1,177,110 | 12/1958 | France. |
| 1,224,204 | 6/1960 | France. |

DARRELL L. CLAY, Primary Examiner

U.S. Cl. X.R.

174—72